(12) United States Patent
Hadady et al.

(10) Patent No.: US 6,229,555 B1
(45) Date of Patent: May 8, 2001

(54) METHOD AND APPARATUS FOR MINIMIZING VISUAL ARTIFACTS GENERATED BY AN ELECTROPHOTOGRAPHIC MACHINE DURING IMAGING

(75) Inventors: Craig Eric Hadady; Cary Patterson Ravitz, both of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/573,145

(22) Filed: May 17, 2000

(51) Int. Cl.[7] ............................. G03G 15/01; H04N 1/00
(52) U.S. Cl. ...................... 347/116; 347/132; 347/234; 358/448
(58) Field of Search ............................ 347/116, 131, 347/132, 234, 248; 358/448, 530, 1.18

(56) References Cited

U.S. PATENT DOCUMENTS 5,719,680  2/1998  Yoshida et al. .

FOREIGN PATENT DOCUMENTS 4-317254  * 11/1992  (JP) .
8-184772  *  7/1996  (JP) .
11-352744 * 12/1999  (JP) .

* cited by examiner

*Primary Examiner*—Joan Pendegrass
(74) *Attorney, Agent, or Firm*—Michael T. Sanderson; Taylor & Aust, P.C.

(57) ABSTRACT

A method and apparatus provides for minimizing visual artifacts resulting from laser scan process direction position errors in an electrophotographic machine. The electrophotographic machine has defined therein a process direction, and includes a photoconductive device having an image forming surface. A printhead unit is provided for generating a laser beam, wherein the printhead unit includes optics for scanning the laser beam to form a plurality of scan lines extending across the photoconductive device in a scan direction which traverses the process direction. Adjacent scan lines of the plurality of scan lines are separated by a scan line separation distance. A controller is electrically coupled to the printhead unit for controlling the power of the laser beam during the scanning of an adjacent pair of scan lines to form a synthesized dot which lies at a synthesized position between the adjacent pair of scan lines.

34 Claims, 3 Drawing Sheets

METHOD AND APPARATUS FOR MINIMIZING VISUAL ARTIFACTS GENERATED BY AN ELECTROPHOTOGRAPHIC MACHINE DURING IMAGING

BACKGROUND OF THE INVENTION

1. Field of the Invention

The present invention relates to an electrophotographic machine, and, more particularly, to a method and apparatus for minimizing visual artifacts resulting from laser scan process direction position errors.

2. Description of the Related Art

In an in-line color electrophotographic imaging process, latent images are formed on a plurality of photosensitive drums, which are in turn developed using a predetermined color of toner. The developed images are then transferred to a sheet of media (such as paper) which travels past the drums. The image in each color is created one line at a time, and the lines are oriented at right angles to the direction of travel of the sheet of media. The individually-generated images combine to form a full-color image. In a typical multi-color laser printer, for example, the sheet of media passes through four color developing stations in series, with the colors being black, magenta, cyan and yellow.

It is recognized that in order for the multi-color laser printer to print accurately, the laser beams for all four colors must be in alignment, both in the scan direction (across the page) and the process direction (feed direction of the print medium). However, providing proper alignment of even a single laser printhead in relation to the sheet of media in the process direction can be difficult. This problem is compounded with the addition each printhead, since the plurality of printheads must be in registration so that the individual images generated by each printhead can be superimposed correctly when combined. During printer assembly an attempt is made to optically align the laser printheads both individually and collectively, but the ability to provide precise alignment is limited by several factors, including component tolerances. In addition, it is possible for a precisely aligned printing system to drift out of alignment due to component aging and/or the influences of printing environment factors, such as the internal temperature changes of the printer that cause distortion of the laser beam optical scan path.

What is needed in the art is a method and apparatus for minimizing visual artifacts resulting from laser scan process direction position errors, such as printhead skew and laser beam optical scan path distortion.

SUMMARY OF THE INVENTION

The present invention provides method and apparatus for minimizing visual artifacts resulting from laser scan process direction position errors, such as printhead skew and laser beam optical scan path distortion.

One aspect of the invention relates to an electrophotographic machine having defined therein a process direction. The electrophotographic machine includes a photoconductive device having an image forming surface, a printhead unit, and a controller. The printhead unit generates a laser beam, and includes optics for scanning the laser beam to form a plurality of scan lines extending across the photoconductive device in a scan direction which traverses the process direction. Adjacent scan lines of the plurality of scan lines are separated by a scan line separation distance. The controller is electrically coupled to the printhead unit for controlling the power of the laser beam during the scanning of an adjacent pair of scan lines to form a synthesized dot having a center which lies at a synthesized position between the adjacent pair of scan lines.

One method of the invention is directed to minimizing visual artifacts resulting from laser scan process direction position errors in an electrophotographic machine, wherein the electrophotographic machine includes a photoconductive device having an image forming surface. The method includes the steps of defining with respect to the surface of the photoconductive device a plurality of pixel locations which form a pixel grid; generating a laser beam; scanning the laser beam to form a plurality of scan lines extending across the photoconductive device in a scan direction which traverses the process direction, wherein adjacent scan lines of the plurality of scan lines are separated by a scan line separation distance; and controlling the power of the laser beam during the scanning of an adjacent pair of scan lines to form a synthesized dot which lies at a synthesized position between the adjacent pair of scan lines, and wherein the synthesized position substantially corresponds to one pixel location of the plurality of pixel locations.

An advantage of the present invention is that the scan path of the laser beams of a multicolor electrophotographic machine can be corrected for printhead skew and optical scan path distortion, both during and after an initial printhead alignment.

Another advantage of the invention is the ability to synthesize the position of dot formation on the photoconductive drum in the process direction.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
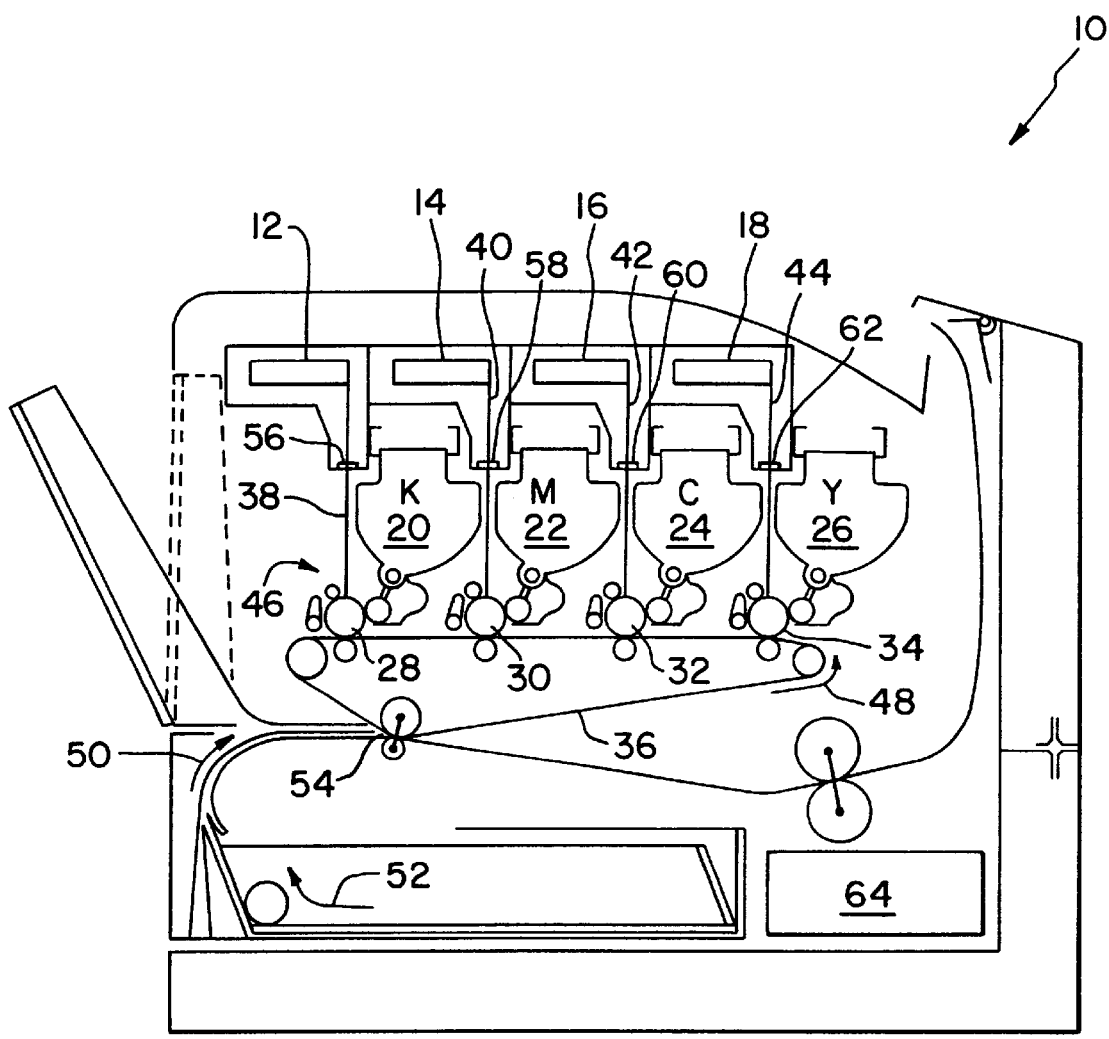
FIG. 1 is a side, sectional view of a multicolor laser printer embodying the present invention.

Referring now to the drawings and, more particularly, to FIG. 1, there is shown one embodiment of a multicolor laser printer 10 including laser printhead units 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser printhead units 12, 14, 16 and 18 include optical components, such as lenses and a rotatable multi-faceted mirror, which focus and scan a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged to approximately −900 volts and is subsequently discharged to a level of approximately −200 volts in the areas of its peripheral surface that are impinged by a respective one of laser beams 38, 40, 42 and 44 to form a latent image thereon made up of a plurality of dots, or spots.

During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged and is conveyed by an electrically conductive roller. During the printing operation, the conveyance roller is biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −200 volts by the laser beams. As belt 36 rotates in the direction indicated by arrow 48, the toner from each of drums 28, 30, 32 and 34 is transferred to the outside surface of belt 36. As a print medium, such as paper, travels along either path 50 or duplexing path 52, the toner is transferred to the surface of the print medium in nip 54.

Each of printhead units 12, 14, 16 and 18 includes a respective one of sensor devices 56, 58, 60 and 62, each of which is placed near the end of a scan line of the associated laser beam, and is used to determine an orientation of the laser printhead in the process direction. Also, each of printhead units 12, 14, 16 and 18 is electrically coupled to and controlled by a printhead controller 64.

Printhead controller 64 includes microprocessor and data signal processing modules, such as a raster image processor (RIP), for processing print data received from a source computer (not shown). In addition, printhead controller 64 includes modules for processing sensor information received from each of sensor devices 56, 58, 60 and 62 for detecting the occurrence of laser scan process direction position errors. If it is determined that printer 10 is generating an excessive number of visual artifacts as a result of laser scan process direction position errors, such as printhead skew and laser beam optical scan path distortion, then the correction method of the present invention is implemented, as is more fully described below.

Each of printheads 12, 14, 16, 18 is substantially identical in structure. Accordingly, to simplify the discussion and for ease of understanding the invention, the operation of the invention will be described with respect to the structure associated with printhead 12. It is to be understood, however, that the discussion that follows with respect to printhead 12 also applies to each of printheads 14, 16, and 18.

Figure 2:
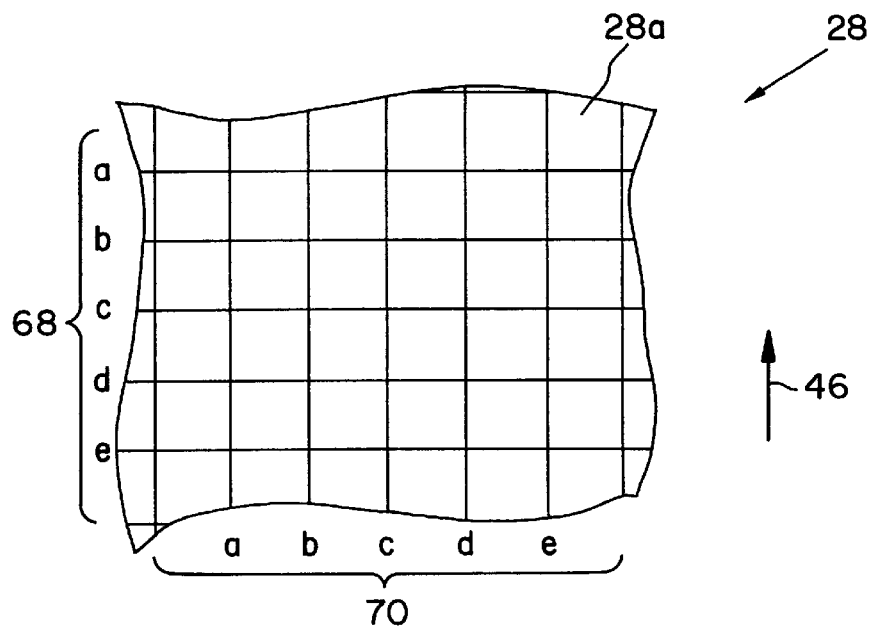
FIG. 2 is a graphical illustration of an imaginary pixel grid defined with respect to a surface of photoconductive drum.

As shown in FIG. 2, an imaginary pixel grid 66 is defined in relation to a surface 28*a* of the photoconductive drum 28. Pixel grid 66 includes a plurality of rows 68 and a plurality of columns 70, wherein each intersection point of rows 68 and columns 70 define an ideal pixel location. Ideally, during latent image formation on photoconductive drum 28, each of a plurality of dots is located at a corresponding pixel location on imaginary pixel grid 66 on photoconductive drum 28. The centers of vertically adjacent pixels, i.e., pixels that are adjacent in process direction 46, are separated in space by a distance in the process direction 46, which will be referred to herein as pixel spacing distance, and which also is the distance between adjacent pixel rows. Also, ideally, the scan line separation distance between adjacent pairs of scan lines is equal to the pixel spacing distance, and ideally each scan line will trace a corresponding row of pixel rows 68. Thus, for example, a printer having a vertical resolution of 600 dots per inch (d.p.i.) has a pixel spacing and scan line spacing of a distance of 1/600ths of an inch and are coincident. However, if a printing system experiences laser scan process direction position errors, such as printhead skew and laser beam optical scan path distortion, the actual location of formation of the dot on the photoconductive drum deviates from the desired pixel location, as illustrated in FIG. 3.

Figure 3:
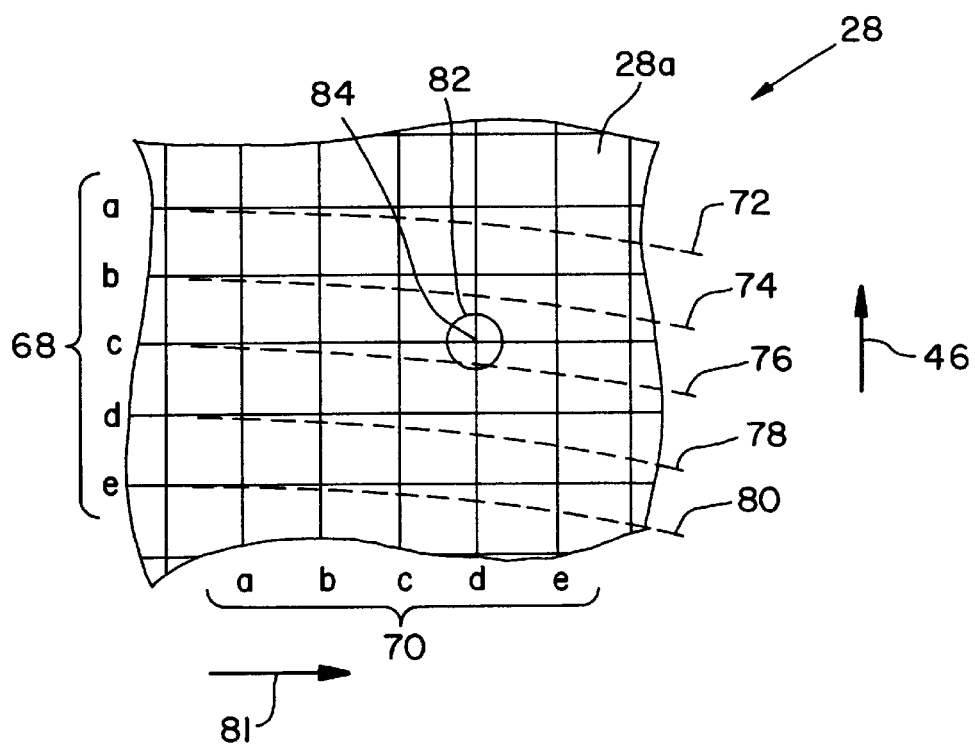
FIG. 3 illustrates a synthesized dot located at a synthesized position between adjacent scan lines.

As illustrated FIG. 3, a plurality of substantially parallel, but bowed, dashed lines represent a plurality of scan lines 72, 74, 76, 78, 80 traced by laser beam 38, which extend in a general scan direction 81 which traverses process direction 46. As shown, the bow and skew of scan lines 72, 74, 76, 78, 80 are highly exaggerated to illustrate the dot positioning problems created by laser scan process direction position errors. Thus, the actual dot locations which are depicted by the intersection of scan lines 72, 74, 76, 78, 80 and pixel columns 70*a–e* are offset in the process direction, and become more pronounced as laser beam 38 is scanned from right to left across photoconductive drum 28 in scan direction 81.

By way of example, assume that it is desired to form a dot at a pixel location having row/column coordinates of 68*c*, 70*d*. In order to minimize the effects of the laser scan process direction position errors, controller 64 controls the output power of laser beam 38 during the scanning of the adjacent pair of scan lines 74 and 76 to form a synthesized dot 82 having a center 84 which lies at a synthesized position between the adjacent pair of scan lines 74 and 76. Preferably, the synthesized position, and in turn center 84 of dot 82, substantially corresponds to the desired pixel location at coordinates 68*c*, 70*d*.

Figure 4:
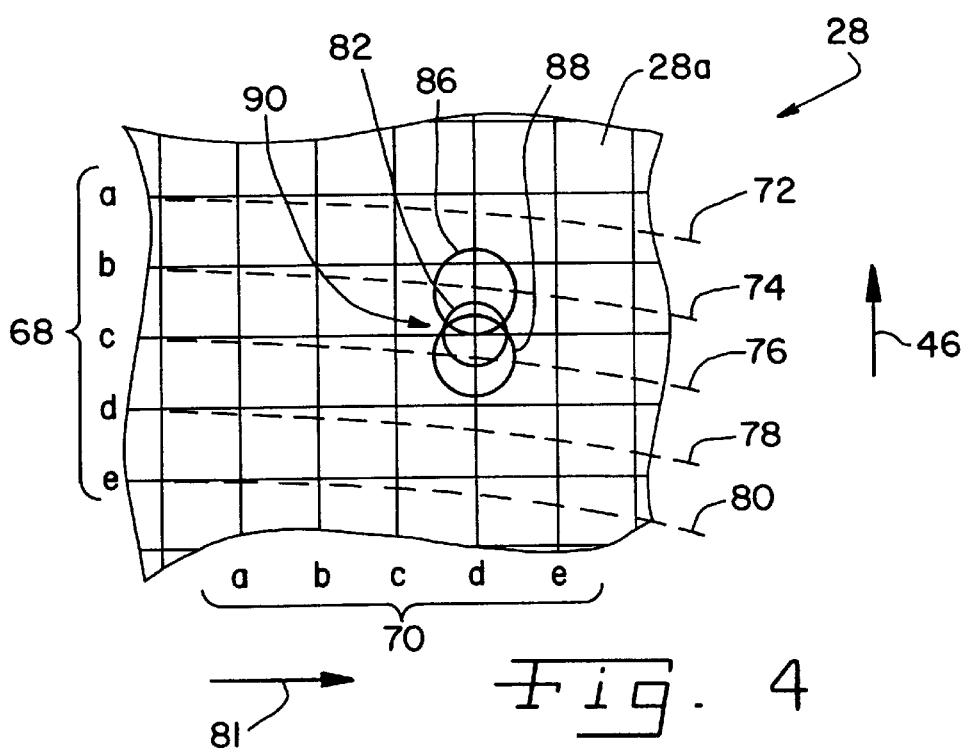
FIG. 4 illustrates the formation of the synthesized dot of FIG. 3.

As graphically illustrated in FIG. 4, synthesized dot 82 is formed from a composite of a first initial dot 86 formed on scan line 74 at column position 70*d* and a second initial dot 88 formed on scan line 76 at column position 70*d*, such that first initial dot 86 and second initial dot 88 are positioned to be in substantial alignment in process direction 46. In the example illustrated in FIG. 4, controller 64 reduces the laser output power of laser beam 38 to approximately one-half full power during the formation of each of initial dots 86, 88. The formation of initial dots 86, 88 results in an energy concentration at region 90 that is sufficient for the formation of synthesized dot 82. Using these principles, the position of the center of the synthesized dot can be varied, at least in part, based upon an amount of difference between the power of laser beam 38 during the formation of initial dot 86 and the power of laser beam 38 during the formation of initial dot 88, and/or based at least in part on the effective magnitude of the power of laser beam 38 during the formation of initial dot 86 and the effective magnitude of the power of laser beam 38 during the formation of initial dot 88. In addition, the shape and size can be varied as well based upon the effective laser power magnitude and/or the power difference selected by controller 64 in the formation of initial dots 86, 88. Thus, the invention provides synthesized print positions spaced at sub pixel vertical (process direction) distances, with respect to pixel grid 66, which are synthesized by dividing the laser power between two consecutive scan lines.

Figure 5:
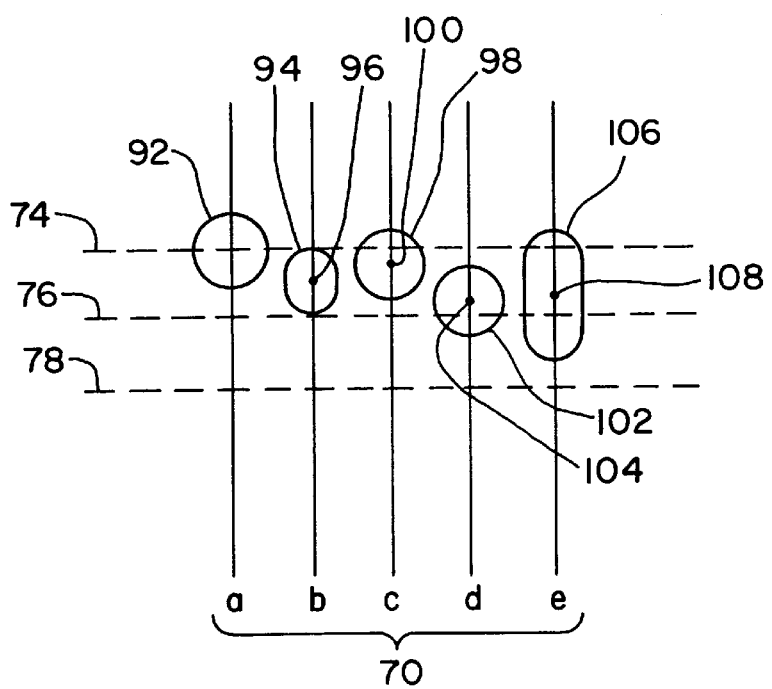
FIG. 5 illustrates how the position, size and/or shape of a synthesized dot can be varied by varying the laser power output between adjacent scan lines.

During operation, with reference to FIG. 5, the page of print data to be printed is divided into vertical (process direction) bands, generally corresponding for example to pixel grid columns 70a–70e. For each band, controller 64 determines a vertical correction based on the laser skew and bow, which is specified in a fraction portion of the scan line separation distance between consecutive adjacent scan lines, i.e., 1/n scan line, wherein n is any non-zero integer. The integer part of the correction is effected by choosing data out of the print buffer from the appropriate raster scan. The fractional part of the correction is effected by synthesizing positions, i.e., dividing the laser power between consecutive, i.e., adjacent, scan lines in a ratio that gives the desired average position at a cumulative power level that gives the nominal density desired.

As graphically illustrated in FIG. 5, dot 92 is formed on scan line 74 along pixel column 70a by controlling printhead unit 12 to generate laser beam 38 at full nominal power. In a pulse width modulated system, this nominal power for the generation of dot 92 can be, for example, 8 pulses formed by gating printhead unit ON and OFF. Assuming the nominal power for a dot in a pulse width modulated system is 8 pulses, if a dot 94 having a center 96 is to be formed halfway between scan lines 74 and 76, controller 64 controls printhead unit 12 so that laser beam 38 is gated equally at each of the adjacent scans, using for example 4 pulses on the first laser scan (scan line 74) and 4 pulses on the second laser scan (scan line 76), or in a given system, perhaps 5 pulses and 5 pulses might give a more accurate total print density. The actual amount of power required to provide the desired results is determined empirically, and then stored in a look-up table for use by controller 64. In a preferred implementation of the invention, only vertical edge pels are affected and vertical interior pels are always printed at full nominal power.

In one preferred implementation of the invention, printer 10 uses two synthesized positions (and no natural positions) located at ¼ and ¾ between each pair of laser scan lines, e.g., scan lines pairs 72, 74; 74, 76; 76, 78; and 78,80. For example, and with reference to FIG. 5, assuming laser full power is achieved with a nominal power of 8 pulses, the ¼ position is approximated by 6 pulses and 3 pulses on adjacent scan lines 74 and 76, respectively, to form dot 98 having a center 100 at approximately the ¼ synthesized position. The ¾ synthesized position is approximated using symmetric power levels 3 and 6 to form dot 102 having a center 104 at approximately the ¾ synthesized position. Using symmetric power levels insures that dot density is the same for both the ¼ and ¾ synthesized vertical positions, which is critical for generating half toned prints. If it is determined that the linear power splits produce sufficient density, then the symmetric power levels could be changed to 6, 2 and 2, 6, respectively, for the ¼ and ¾ synthesized vertical positions. However, it was found in the present system that using symmetric power levels 6, 3 and 3, 6 produces better single pixel dots, horizontal lines, and diagonal lines.

Dot 106 shows the result of two vertically aligned dots, each nominally printed at power levels 6, 3, which adds to power levels 6, 3+6, 3 or 6, 9, 3. To maintain solid area density, the middle scan line is at power level 8 instead of 9, i.e., 6, 8, 3.

For multiple shade level dots, such as those used by image enhancement technology (IET) halftone screens, each power level (8,7,6,5,4,3,2,1) of the dot must be given an appropriate set of split levels, such as for example, (6,3; 6,2; 5,2; 4,2; 4,0; 3,0; 2,0; 1,0) for consecutive scan lines. The visual positions of these partial dots do not need to line up precisely with the full dots, as they are simply incremental shade levels of clustered dots which are positioned by their vertical edges.

The technique of using two synthesized positions, described above, gives vertical correction roughly equivalent to using 1200 dpi scan lines on a 600 dpi printer. Empirically, symmetric power levels give equal print density regardless of the specific power levels, insuring good half toned prints and consistent thin line density. And, using a slight power boost over linear levels improves single pel dots and lines.

Furthermore, symmetry can be used to simplify higher resolution schemes. For example, symmetric power levels 7,1; 5,3; 3,5 and 1,7 give an n/4 dot spacing, or 2400 dpi on a 600 dpi system.

The present invention has been described herein as being used in conjunction with a laser printer. However, it is to be understood that it is possible for the present invention to be adapted for use in conjunction with other types of electrophotographic imaging apparatus, such as a copier machine. Also, the implementation described above for minimizing visual artifacts resulting from laser scan process direction position errors can be adapted for use in a dual laser beam printhead by controlling the printhead so that both laser generators of the printhead are energized at appropriate power levels to form a dot at a synthesized location intermediate of the dot positions which would otherwise be formed by the two laser generators individually.

While this invention has been described as having a preferred design, the present invention can be further modified within the spirit and scope of this disclosure. This application is therefore intended to cover any variations, uses, or adaptions of the invention using its general principles. Further, this application is intended to cover such departures from the present disclosure as come within know or customary practice in the art to which this invention pertains and which falls within the limits of the appended claims.

What is claimed is:

1. An electrophotographic machine having defined therein a process direction, comprising:

a photoconductive device having an image forming surface;

a printhead unit for generating a laser beam, said printhead unit including optics for scanning said laser beam to form a plurality of scan lines extending across said photoconductive device in a scan direction which traverses said process direction, wherein adjacent scan lines of said plurality of scan lines are separated by a scan line separation distance; and a controller electrically coupled to said printhead unit for controlling the power of said laser beam during the scanning of an adjacent pair of scan lines to form a synthesized dot having a center which lies at a synthesized position between said adjacent pair of scan lines.

2. The electrophotographic machine of claim 1, wherein said synthesized dot is formed from a composite of a first initial dot formed on a first scan line of said adjacent pair of scan lines and a second initial dot formed on a second scan line of said adjacent pair of scan lines, said first initial dot and said second initial dot being positioned to be in substantial alignment in said process direction.

3. The electrophotographic machine of claim 2, wherein said controller controls the power of said laser beam during the generation of each of said first initial dot and said second initial dot to be substantially equal, but reduced from full power.

4. The electrophotographic machine of claim 2, wherein said controller controls the power of said laser beam during the generation of said first initial dot to be less than the power of said laser beam during the generation of said second initial dot.

5. The electrophotographic machine of claim 2, wherein said controller controls the power of said laser beam during the generation of said second initial dot to be less than the power of said laser beam during the generation of said first initial dot.

6. The electrophotographic machine of claim 1, wherein said controller controls said printhead unit to form multiple process direction arranged pixel dots of nominal interior power, but adjusted power for the pixel dots on top and bottom scan lines, respectively.

7. The electrophotographic machine of claim 1, wherein said synthesized position is dependent at least in part upon an amount of difference between the power of said laser beam during the formation of said first initial dot and the power of said laser beam during the formation of said second initial dot.

8. The electrophotographic machine of claim 7, wherein said synthesized position is dependent at least in part upon a first magnitude of the power of said laser beam during the formation of said first initial dot and a second magnitude of the power of said laser beam during the formation of said second initial dot.

9. The electrophotographic machine of claim 8, wherein said first magnitude and said second magnitude are equal.

10. The electrophotographic machine of claim 1, wherein at least one of a shape and a size of said synthesized dot is dependent at least in part upon an amount of variation between the power of said laser beam during the formation of said first initial dot and the power of said laser beam during the formation of said second initial dot.

11. The electrophotographic machine of claim 10, wherein said at least one of said shape and said size of said synthesized dot is dependent at least in part upon a first magnitude of the power of said laser beam during the formation of said first initial dot and a second magnitude of the power of said laser beam during the formation of said second initial dot.

12. The electrophotographic machine of claim 1, further comprising a developer for supplying toner that is electrostatically attracted to said synthesized dot.

13. The electrophotographic machine of claim 1, wherein said controller selects the power of said laser beam by modulating said laser beam.

14. A unit for minimizing visual artifacts resulting from laser scan process direction position errors in an electrophotographic machine, said electrophotographic machine including a photoconductive device having an image forming surface having defined thereon a plurality of pixel locations which form a pixel grid, said unit comprising:

a printhead unit for generating a laser beam, said printhead unit including optics for scanning said laser beam to form a plurality of scan lines extending across said photoconductive device in a scan direction which traverses said process direction, wherein adjacent scan lines of said plurality of scan lines is separated by a scan line separation distance; and a controller electrically coupled to said printhead unit for controlling the power of said laser beam during the scanning of an adjacent pair of scan lines to form a synthesized dot having a center which lies at a synthesized position between said adjacent pair of scan lines, said synthesized position substantially corresponding to one pixel location of said plurality of pixel locations.

15. The unit of claim 14, wherein said synthesized dot is formed from a composite of a first initial dot formed on a first scan line of said adjacent pair of scan lines and a second initial dot formed on a second scan line of said adjacent pair of scan lines, said first initial dot and said second initial dot being positioned to be in substantial alignment in said process direction.

16. The unit of claim 15, wherein said controller controls the power of said laser beam during the generation of each of said first initial dot and said second initial dot to be substantially equal, but reduced from full power.

17. The unit of claim 15, wherein said controller controls the power of said laser beam during the generation of said first initial dot to be less than the power of said laser beam during the generation of said second initial dot.

18. The unit of claim 15, wherein said controller controls the power of said laser beam during the generation of said second initial dot to be less than the power of said laser beam during the generation of said first initial dot.

19. The unit of claim 14, wherein said controller controls said printhead unit to form multiple process direction arranged pixel dots of nominal interior power, but adjusted power for the pixel dots on top and bottom scan lines, respectively.

20. The unit of claim 14, wherein said synthesized position is dependent at least in part upon an amount of difference between the power of said laser beam during the formation of said first initial dot and the power of said laser beam during the formation of said second initial dot.

21. The unit of claim 20, wherein said synthesized position is dependent at least in part upon a first magnitude of the power of said laser beam during the formation of said first initial dot and a second magnitude of the power of said laser beam during the formation of said second initial dot.

22. The unit of claim 21, wherein said first magnitude and said second magnitude are equal.

23. The unit of claim 14, wherein at least one of a shape and a size of said synthesized dot is dependent at least in part upon an amount of variation between the power of said laser beam during the formation of said first initial dot and the power of said laser beam during the formation of said second initial dot.

24. The unit of claim 23, wherein said at least one of said shape and said size of said synthesized dot is dependent at least in part upon a first magnitude of the power of said laser beam during the formation of said first initial dot and a second magnitude of the power of said laser beam during the formation of said second initial dot.

25. The unit of claim 14, further comprising a developer for supplying toner that is electrostatically attracted to said synthesized dot.

26. The unit of claim 14, wherein said controller selects the power of said laser beam by modulating said laser beam.

27. A method for minimizing visual artifacts resulting from laser scan process direction position errors in an electrophotographic machine, said electrophotographic machine including a photoconductive device having an image forming surface, said method comprising the steps of:

defining with respect to said surface thereon a plurality of pixel locations which form a pixel grid;

generating a laser beam;

scanning said laser beam to form a plurality of scan lines extending across said photoconductive device in a scan direction which traverses said process direction, wherein adjacent scan lines of said plurality of scan lines are separated by a scan line separation distance; and controlling the power of said laser beam during the scanning of an adjacent pair of scan lines to form a synthesized dot which lies at a synthesized position between said adjacent pair of scan lines, said synthesized position substantially corresponding to one pixel location of said plurality of pixel location.

28. The method of claim 27, wherein said synthesized dot is formed by the further steps of:

forming a first initial dot on a first scan line of said adjacent pair of scan lines; and forming a second initial dot on a second scan line of said adjacent pair of scan lines, said first initial dot and said second initial dot being positioned to be in substantial alignment in said process direction.

29. The method of claim 28, further comprising the step of controlling the power of said laser beam during the generation of each of said first initial dot and said second initial dot to be substantially equal, but reduced from full power.

30. The method of claim 28, further comprising the step of controlling the power of said laser beam during the generation of said first initial dot to be less than the power of said laser beam during the generation of said second initial dot.

31. The method of claim 28, further comprising the steps of controlling the power of said laser beam during the generation of said second initial dot to be less than the power of said laser beam during the generation of said first initial dot.

32. The method of claim 28, wherein said controller controls said printhead unit to form multiple process direction arranged pixel dots of nominal interior power, but adjusted power for the pixel dots on top and bottom scan lines, respectively.

33. The method of claim 27, wherein said controlling step further comprises the step of controlling the power of said laser during the scanning of said adjacent pair of scan lines to define at least a second synthesized position between said adjacent pair of scan lines.

34. The method of claim 33, wherein the first synthesized position and said second synthesized position are each selected to be spaced from each scan line of said adjacent pair of scan lines by a fraction of said scan line separation distance, and wherein the denominators of each fraction are equal.

* * * * *